United States Patent [19]

Kiser

[11] Patent Number: 4,994,640
[45] Date of Patent: Feb. 19, 1991

[54] WELDING ELECTRODE

[75] Inventor: Samuel D. Kiser, Catawba, N.C.

[73] Assignee: Inco Alloys International, Inc., Huntington, W. Va.

[21] Appl. No.: 502,638

[22] Filed: Apr. 2, 1990

[51] Int. Cl.⁵ .............................................. B23K 35/22
[52] U.S. Cl. ............................ 219/145.22; 219/146.22
[58] Field of Search ........... 219/145.22, 146.1, 146.22, 219/146.23, 137 WM

[56] References Cited

U.S. PATENT DOCUMENTS 3,778,588 12/1973 Bishel .............................. 219/146.22
3,851,142 11/1974 Bishel .............................. 219/146.1
3,851,143 11/1974 Bishel .............................. 219/146.1
4,534,793 8/1985 Olson et al. .................... 219/146.23
4,726,854 2/1988 Olson et al. .................... 219/145.22

Primary Examiner—Clifford C. Shaw
Attorney, Agent, or Firm—Edward A. Steen; Francis J. Mulligan, Jr.

[57] ABSTRACT

A flux cored welding electrode made from a nickel-iron-manganese sheath circumscribing a flux core. A portion of manganese is substituted for nickel to reduce electrode cost while retaining the desirable properties of a conventional 36% nickel welding electrode.

7 Claims, No Drawings

WELDING ELECTRODE

TECHNICAL FIELD

The instant invention relates to arc welding in general and, more particularly, to a flux cored, nickel-iron-manganese sheath welding electrode especially useful for welding cast irons.

BACKGROUND ART

There are numerous welding electrodes on the market today, each designed for broad or specific welding applications. Their compositions are functions of the tasks to which they are assigned.

In particular, electrodes useful for cast iron welding include nickel. Unfortunately, anyone following or consuming nickel is aware of the vagaries of the marketplace. The recent price of nickel has been both depressed and elevated, causing price disruptions to the ultimate purchasers.

Accordingly, it is desired to reduce the percentage of nickel in welding electrodes without simultaneously losing the desirable characteristics imparted by nickel.

Manganese filler has been suggested as a nickel substitute in low carbon steel welding wire electrodes. See U.S. Pat. Nos. 4,534,793 and 4,726,854.

The use of manganese filler has also been suggested by U.S. Pat. Nos. 3,778,588, 3,851,142 and 3,851,143. Indeed assignee produces a successful product based upon the '588 patent called NI-ROD ® FC 55 welding electrode.

However, as far as applicant is aware, there are no flux cored type electrodes that have reduced nickel contents that are allowed by the addition of manganese.

SUMMARY OF THE INVENTION

This invention relates to flux cored welding electrodes especially suited for cast iron welding. A nickel-iron-manganese sheath encompasses a welding flux including manganese, slagging agents and deoxidizers.

PREFERRED EMBODIMENT OF THE INVENTION

As alluded to beforehand, with gyrating costs of nickel, it is desirable to reduce the cost of welding products that contain nickel as an active ingredient. Since manganese does not form a stable carbide (behaving similarly to nickel in this regard), it may be substituted for nickel up to about 20% without the attendant loss of good weldability characteristics.

The sheath itself may include about 40–50% nickel, about 11–20% manganese, up to about 1.5% carbon, the remainder iron and residual impurities. More particularly the sheath includes about 40–45% nickel, about 11–13% manganese, about 0.3% carbon, remainder iron. Alternatively, since the entire electrode preferably is about 80% weight percent sheath and 20% weight percent flux the nickel may range from about 32–40%, the manganese from about 8.8–16%, up to about 1.9% carbon, the remainder iron and residual impurities.

The flux ingredients may range from about, in weight percent, as follows:

|  | Total Electrode* | Flux Alone |
| --- | --- | --- |
| Carbon (graphite) | .75–8.0 | 3.75–40 |
| Mn | 1.0–8.0 | 5.0–40 |
| Si | .5–2.0 | 2.5–10 |
| Al | .02–2.0 | 0.1–10 |
| Ca | .30–1.0 | 1.5–5.0 |
| Mg | .20–1.0 | 1.0–5.0 |
| $CaF_2$ | 6.0–16.0 | 30–80 |
| $Na_3AlF_6$ | 0–3.0 | 0–15 |
| MgO | .20–2.0 | 1.5–10 |
| Other Fluorides | 0–2.0 | 0–10 |

*Total Electrode preferably encompasses about 80% weight percent sheath and 20% flux A preferred target weld deposit chemistry ranges from about 40–44% nickel and about 11–13% manganese, with a preferred total combined nickel plus manganese about 51–57%, and more preferably about 54%, the remainder being substantially iron and small quantities of the other ingredients. Assuming a reasonable 30% dilution rate, that is (70%) of (51–57%), the deposit averages out to be about 35.7–39.9% or preferably about 37.8% [(70%) of (54%)] Ni+Mn in the deposit. This is most desirable since its physical characteristics approach those of a 36% nickel, balance iron weld deposit. This ultimate target weld deposit exhibits a very low coefficient of thermal expansion allowing its use with cast irons.

While it is possible to form the instant electrode by using a seamless tube made from the sheath material, it is preferred to form the sheath from strip.

The strip is made by bending the strip into a generally U-shaped trough, depositing the flux materials, preferably in powder form, into the trough, further bending the ends of the trough to overlap, and then drawing down the resultant tube to the desired diameter and to consolidate the flux core materials in the tube.

The instant invention results in numerous benefits:

(A) Better tolerance for welding sulfur bearing cast irons since manganese forms a stable sulfide.

(B) Reduced solidus of the weldment alloy to more closely match the solidus of grey cast iron. This reduces liquation cracking tendency in the cast iron heat-affected zone.

(C) Due to the mismatch in atomic diameter of nickel and manganese, matrix stiffening of the weldment occurs. This provides 100% joint efficiency in stronger ductile irons.

(D) Traditional graphite rejection during solidification reduces any tendency for cracking in cast irons and enhances machinability.

(E) Higher manganese content imparts high work hardenability, thus the electrode is imminently suitable for surfacing cast iron rolling surfaces.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows.

1. A flux cored welding electrode, the electrode comprising a sheath and a core, the sheath consisting essentially of about 40–50% nickel, about 11–20% manganese, up to about 1.5% carbon, the balance iron and residual impurities, and the flux consisting essentially of about 3.75-40% carbon, about 5-40% manganese, about 2.5-10% silicon, about 0.1-10% aluminum, about 1.5-5% calcium, about 1-5% magnesium, about 30-80% calcium fluoride, up to about 15% $Na_3ALF_G$, about 1.5-10% manganese oxide, and up to about 10% additional fluorides.

2. The electrode according to claim 1 wherein a weld deposit made therefrom includes about 35.7-39.9% nickel plus manganese.

3. The electrode according to claim 2 wherein a weld deposit made therefrom includes about 37.8% nickel plus manganese.

4. The electrode according to claim 1 wherein the sheath comprises about 40-45% nickel, about 11-13% manganese, about 0.3% carbon, the balance substantially iron.

5. The welding electrode according to claim 1 wherein the sheath comprises in weight percent about 80% of the electrode and the flux comprises in weight percent about 20% of the electrode.

6. A weld deposit made from a flux cored welding electrode, the weld deposit consisting essentially of about 40-45% nickel, about 11-13% manganese, about 0.3% carbon, and the balance essentially iron.

7. A flux cored welding electrode, the electrode including a sheath and a flux core, the sheath consisting of as a percentage of the total electrode, about 44% nickel, about 11% manganese, about 1% carbon, about 0.5% silicon, about 0.1% copper, about 0.5% aluminum, the balance essentially iron, and the flux core consisting of as a percentage of the total electrode, about 0.75-8% carbon, about 1-8% manganese, about 0.5-2% silicon, about 0.02-2% aluminum, about 0.3-1% calcium, about 0.2-1% magnesium, about 6-16% calcium fluoride, up to about 3% $Na_3AlF_6$, and about 0.2-2% MgO.

* * * * *